Nov. 1, 1966  LE ROY R. BOGGS  3,283,050
METHOD AND APPARATUS FOR MAKING CONTINUOUS LENGTHS OF
THREADED FIBER REINFORCED RESIN ARTICLES
Filed April 6, 1965  6 Sheets-Sheet 1

INVENTOR.
Le Roy R. Boggs
BY
ATTORNEYS

United States Patent Office 3,283,050
Patented Nov. 1, 1966

3,283,050
METHOD AND APPARATUS FOR MAKING CONTINUOUS LENGTHS OF THREADED FIBER REINFORCED RESIN ARTICLES
Le Roy R. Boggs, Bristol, Tenn., assignor to Universal Moulded Fiber Glass Corp., Bristol, Va., a corporation of Delaware
Filed Apr. 6, 1965, Ser. No. 445,896
22 Claims. (Cl. 264—137)

This invention relates to the production of threaded fiber reinforced resin articles and is particularly concerned with method and equipment for producing continuous lengths of such articles threaded either externally or internally.

The method and equipment of the invention are capable of continuous operation, but the references herein to the production of continuous lengths of the threaded articles are not intended to be limited to continuous operations. Indeed, it is of advantage that the method and equipment are capable of being intermittently operated.

The principal objective of the invention is to provide a method and equipment capable of producing threaded articles by the extraction type of technique, i.e., an operation according to which fiber reinforcement and liquid but hardenable resin material are fed into a forming device, the resin material being solidified in the forming device, and the solidified article being pulled from the forming device by a puller mechanism engaging the solidified article beyond the discharge end of the forming passage provided in the forming device.

In accordance with the preferred practice of the invention, the threaded articles are prepared in tubular form, with the threads disposed either exteriorly of the tube or interiorly thereof. For this purpose a forming device is employed comprising an external die part or member and an internal core part or member cooperating to define an annular forming passage, either the die member or the core member being threaded and provision being made for rotation of the threaded member as the article is drawn from the forming passage. In this way a continuous thread may be formed upon the article, the rotation of the threaded member, in effect, resulting in "unscrewing" of the threaded member from the threaded article as it is formed.

In accordance with another aspect of the invention it is contemplated to produce threaded articles by means of equipment of the continuous filament winding type. Apparatus of that type is disclosed in my copending application Serial No. 299,636, filed August 2, 1963, and in accordance with the present invention changes have been introduced into the equipment in order to make possible the production of the threaded types of articles referred to.

In the continuous filament winding type of equipment, provision is made for helically winding reinforcement elements and introducing such elements axially of the helix into the annular forming passage, with the advantageous result that the articles formed incorporate reinforcement elements disposed helically therein. At the same time it is also contemplated that other reinforcement elements be present, including various reinforcement elements extended lengthwise of the continuous article being made.

It is also to be pointed out that an important objective of the invention is to provide threaded articles in tubular form, the threads being either internal or external, which articles are further characterized by having smoothly molded surfaces defining the threads. Molded threads of this type in an article formed of fiber reinforced resin material, and especially where the reinforcement comprises glass fibers as is preferred, is of great advantage when compared with threaded articles made by machining or cutting threads on or within a molded fiber reinforced resin article. The cutting or machining of threads on a previously molded article results in breakage and exposure of the reinforcement fibers at the cut surfaces, which is particularly disadvantageous where the fibers are glass fibers, because of the consequent splintering and powdering of the glass which occurs not only in the machining itself but also in subsequent use of the article.

How the foregoing objects and advantages are attained will appear more fully from the following description referring to the accompanying drawings illustrating two preferred embodiments, one providing for production of an externally threaded article and the other providing for production of an internally threaded article. In these drawings:

FIGURES 4a and 4b, taken together illustrate portions of the equipment shown in FIGURE 3 in vertical section in the plane indicated by the line 4—4 on FIGURE 8, the parts here being shown on an enlarged scale as compared with FIGURE 3 and also as compared with FIGURE 8;

FIGURE 5 is a horizontal sectional view through certain parts taken as indicated by the lines 5—5 on FIGURE 4a;

FIGURE 10 is a view taken substantially as indicated by the line 10—10 on FIGURE 9a, this view being on a reduced scale as compared with FIGURE 9a;

FIGURE 11 is a horizontal sectional view taken as indicated by the line 11—11 on FIGURE 9a, this view being on the same scale as FIGURE 9a.

Figures 1, 2, 3:
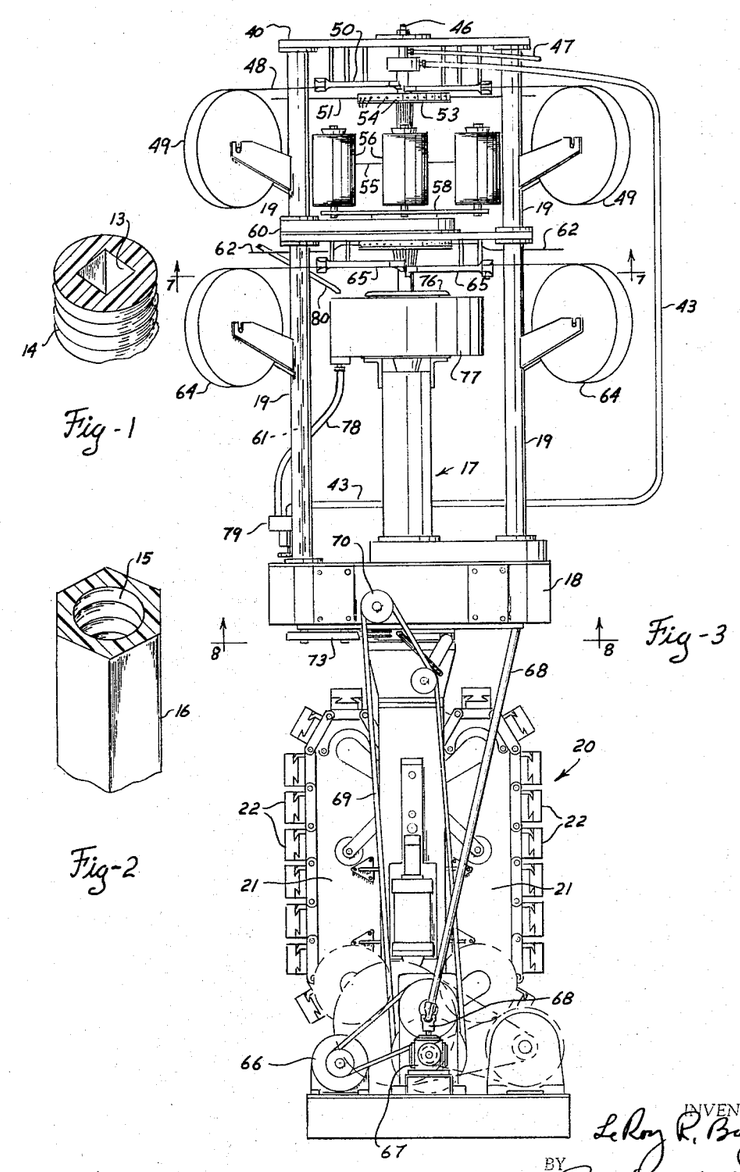
FIGURE 1 is a fragmentary isometric view of a portion of an externally threaded article adapted to be made in accordance with the invention.
FIGURE 2 is a similar fragmentary isometric view of an internally threaded article adapted to be made according to the invention.
FIGURE 3 is a side elevational view with various parts illustrated somewhat diagrammatically or in outline of a machine of the continuous filament winding type adapted for the production of an externally threaded article such as shown in FIGURE 1.

Referring first to FIGURE 1, the article there shown will be seen to be of tubular shape, having a central squared aperture or bore 13 and having the external molded thread 14. Although the interior cavity in the article in FIGURE 1 could be shaped in some manner other than square, it is preferred that the interior cavity be of angular cross section, for reasons which will appear later.

Similarly with respect to the article shown in FIGURE 2, it will be noted that as there shown the article is provided with interior threading indicated at 15 and also with an exterior surface which in this instance is indicated as hexagonal—see reference numeral 16. The external shape may be other than hexagonal, although some angular cross section is preferred, for reasons referred to hereinafter.

Turning now to the equipment for producing an externally threaded article, which equipment is illustrated in FIGURES 3 to 8 inclusive, reference is first made to FIGURE 3 which shows the general arrangement of the apparatus. As there shown the equipment is vertically arranged, i.e., is arranged so that the reinforcement elements and resin material are fed vertically downwardly. Toward the center of FIGURE 3 a forming device is arranged, this being generally indicated by the numeral 17. This forming device is mounted upon supporting structure such as shown at 18. Above the forming device 17 various devices are arranged for feeding fiber reinforcements and liquid resin material into the forming device, these devices being mounted by means of upright sectionalized hollow posts 19 which rise from the main supporting structure 18. The main supporting structure 18 also serves to mount the puller mechanism indicated generally at 20, which puller mechanism is slung below the structure 18. The puller mechanism incorporates a pair of crawler treads 21–21, each equipped with a series of gripping blocks 22 which engage and grip the article being discharged downwardly from the forming device 17 and which serve to draw the formed article from the forming passage in the forming device, thereby also drawing into the forming passage additional reinforcements and liquid resin in the manner which will further appear herebelow.

Figure 4A:
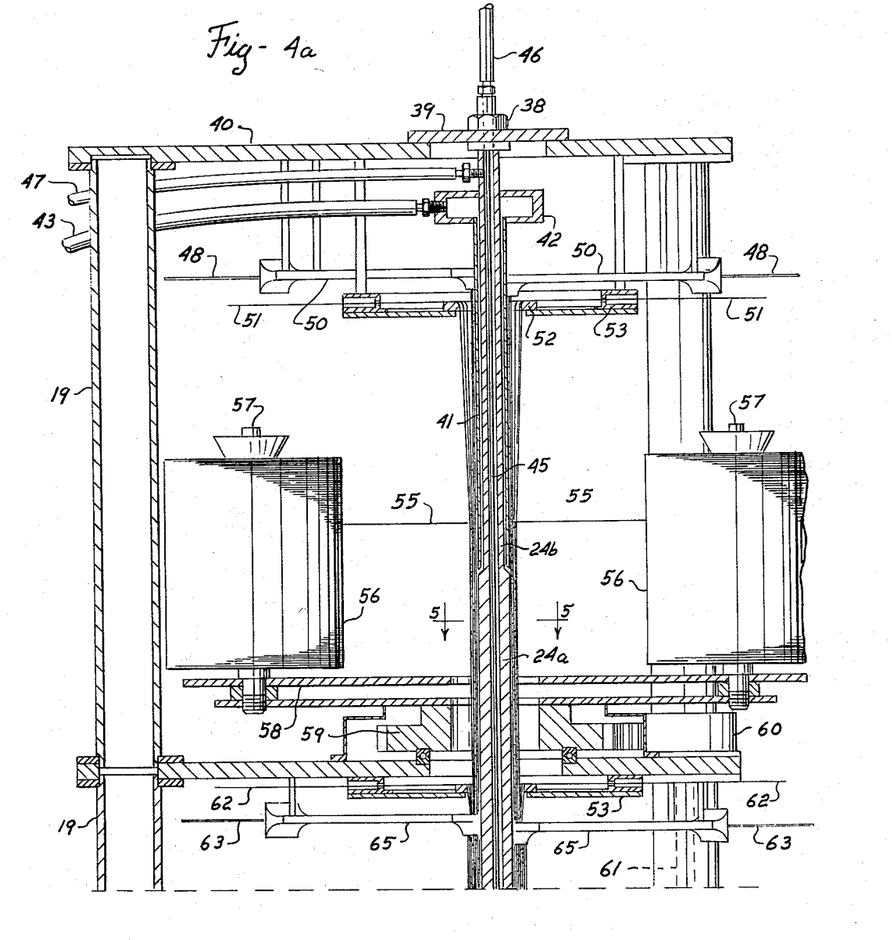
Figure 5:
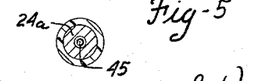
Figure 6:
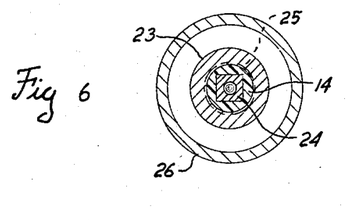
FIGURE 6 is a horizontal sectional view of certain of the parts taken as indicated by the line 6—6 on FIGURE 4b.
Figure 7:
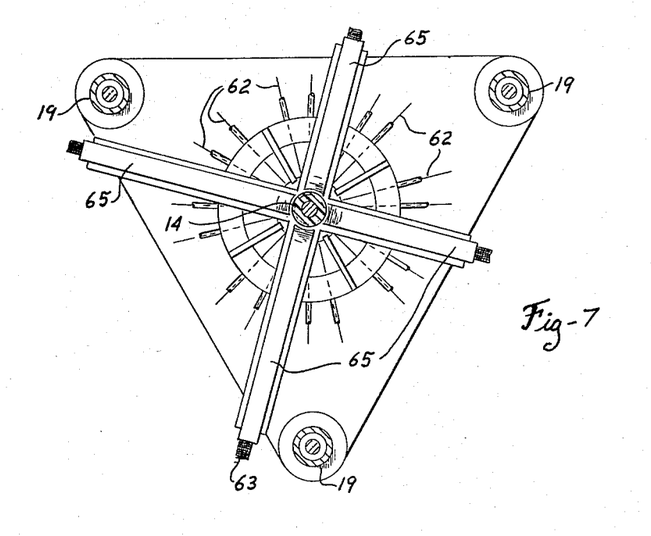
FIGURE 7 is a view taken as indicated by the line 7—7 on FIGURE 4a but on an enlarged scale.

With the foregoing description of the general arrangement of the equipment in mind, attention is now directed more particularly to certain features as shown in FIGURES 4a and 4b. Beginning with the forming device itself, it will be seen that the device 17 is made up of a tubular member 23 which is in the nature of an external or die member, within which is located the internal core member 24. The die member 23 is cylindrical and is provided with threads on its interior surface, these being the threads adapted to mold the threads on the exterior surface of the article being formed. The threading is indicated at 25 in FIGURES 4b and 6. From FIGURE 6 it will also be seen that the core member 24 is of square cross section, so that the article produced will take the form shown in FIGURES 1 and 8, having an exterior cylindrical threaded surface and having an interior bore of square shape.

Fiber reinforcement and liquid resin material are fed into the upper end of the annular forming passage provided between the die and core parts 23 and 24, the specific arrangement of the various feed mechanisms being considered herebelow. Before proceeding with that description, however, attention is called to the fact that the die part 23 is rotatively mounted within the sleeve or jacket 26, the sleeve 26 itself being nonrotative and anchored as by studs cooperating with the flange 27 at its lower end. The die part 23 is adapted to be rotated by means of a gear 28 which is secured to the die part, this gear being connected by means of additional gears 29 with the drive shaft 30, which latter is connected with the shaft 68 (see also FIGURES 3 and 8).

The sleeve or jacket 26 serves to define annular chambers 31 and 32 surrounding the die part 23, the die part having flanges 33 carrying sealing rings 34 which define the end walls of the chambers 31 and 32. Chamber 31 is provided for the circulation of a heating medium, which may be effected through the connections 35 and similarly chamber 32 is provided for a cooling medium, which may be circulated by means of connections 36.

It is here noted that in the preferred practice of the invention the liquid resin material employed is of the type which is thermosetting or heat hardenable, for instance the well known polyester laminating resins, and the heating which is effected by the circulation of a heating medium through the chamber 31 acts to solidify the liquid resin material as it passes through the annular forming passage defined by the inner threaded wall of the die 23 and the exterior surface of the core 24.

From FIGURE 4b it will be noted that the inner surface of the entrance end of the die 23 is flared to an enlarged inlet opening as indicated at 37, this being provided for the purpose of imposing a compressing action upon the resin impregnated reinforcements entering the forming passage. This is the region of the cooling chamber 32, the cooling effect being provided in order to maintain the resin material at a temperature sufficiently low to preclude solidification of the resin until the lower heated portion of the die is reached. Preferably the threading on the interior surface of the die 23 extends only throughout the portion of uniform cross section, i.e., from a point adjacent the lower end of the flared part 37 downwardly to the bottom.

From FIGURES 4a and 4b it will further be seen that the core member 24 has an upward extension which, in effect, constitutes a guide structure on which plies of fiber reinforcements are laid or wound in the manner to be described. This upward extension of the core member is indicated at 24a in both FIGURES 4a and 4b. In the upper portion of the extension 24a, shortly above the section line 5—5 appearing in FIGURE 4a, the core member is reduced in size as indicated at 24b. Moreover, from a point upstream of the entrance end portion of the forming passage, the core extension or reinforcement guide structure 24a is preferably of circular, rather than angular cross section, of the same peripheral dimension as the angular portion located within the die. This is desirable in order to facilitate even and uniform application of the reinforcement plies, as is fully brought out in my copending application Serial No. 427,312, filed January 22, 1965. The circular cross section of the core in this region is also indicated in the horizontal sectional view of FIGURE 5.

The external upper end of the core part 24b is desirably threaded to receive a nut 38 bearing against the plate 39 which in turn is supported by the topmost deck 40 of the machine, which deck is carried at the upper end of the sectionalized posts 19. This mounting thus provides for suspension of the entire core structure 24–24a–24b from the upper end of the machine and the mounting preferably includes appropriate means for ensuring against rotation of the core part.

A sleeve 41 surrounds the uppermost structure 24b of the core part, a resin supply chamber 42 being associated with this sleeve and providing for delivery of liquid resin material through the annular space between the sleeve 41 and the core part 24b, which resin material is delivered at the lower end of the sleeve through an annular orifice to the exterior surface of the core part 24a on which the various reinforcement elements are laid, thereby providing for impregnation of the reinforcement elements with the reinforcement material. Toward the top of FIGURE 4a a supply pipe 43 is shown for delivering resin material to the chamber 42.

The core parts 24a and 24b are also interiorly hollow, the lower end of this interior chamber being closed off by a plug indicated at 44 in FIGURE 4b. This interior hollow constitutes a cooling chamber within the guide structure 24, and for the purpose of circulating a cooling medium therein, a central tube 45 is provided, this tube being of smaller outside diameter than the bore within the core part and being extended downwardly to a point shortly above the plug 44. A cooling medium is preferably introduced into the core bore by the supply connection 46 and may be withdrawn from that bore by means of the connection 47 (see upper portion of FIGURE 4a). The purpose of the introduction of the cooling medium within the core bore is to aid in maintaining the upper portion of the core to which the liquid resin is supplied at a temperature sufficiently low to avoid premature curing or solidification of the resin or of constituents therein.

As seen particularly in FIGURES 3 and 4a, the reinforcement plies supplied to the guide structure 24a include reinforcement elements of several kinds which are fed to the guide at several successive stages. The first ply is preferably made up of strips, for instance glass fiber mat, such strips being indicated at 48, these being supplied from reels 49 and being guided to the central guide structure by means of tubular guides 50 of flatted cross section. Preferably four of these strips are fed in radially toward the center of the equipment, and are then deflected downwardly along the guide structure 24a.

Just below the introduction of the strips 48, a series or ply of rovings 51 are advantageously delivered radially inwardly toward the central structure and are then fed downwardly over the inner edge of a guide ring 52 so as to extend longitudinally of the direction of feed. While only two of these rovings are illustrated in FIGURES 3 and 4a it will be understood that many rovings will be incorporated in this ply, for which purpose a guide ring 53 is provided having a multiplicity of guide apertures such as indicated at 54 in FIGURE 3 distributed throughout the circumference of the ring 53.

At the next stage, a plurality of rovings, for instance four rovings two of which are indicated in FIGURE 4a at 55 are helically wound on top of the reinforcements previously introduced, these rovings 55 being supplied from spools 56 carried by spindles 57 which are mounted upon a turntable 58. Rotation of the turntable will effect helical winding of the rovings 55 around the central structure thus introducing a ply of rovings in helical pattern. Mechanism for effecting rotation of the turntable includes gearing such as shown at 59 contained within a casing 60 and serving to deliver power from the shaft 61 located in one of the sectionalized posts 19 to the turntable 58. The details of this gearing and drive arrangement need not be considered herein, but for further information reference may be made to the copending application above referred to, Serial No. 299,636.

At an elevation below the rovings 55, additional rovings 62 are introduced, these being arranged in a ply in the same manner as rovings 51 above described. Below the rovings 62, additional strips of reinforcement, such as random fiber mat strips 63, are introduced from supply reels 64 through guides 65 arranged in the manner of the guides 50. The arrangement of these guides will further appear from the horizontal sectional view of FIGURE 7. It may here be noted that the general arrangement of the guides 50 for the reinforcement strips 48 is similar to that of the guides 65 illustrated in FIGURE 7.

It should be understood that various patterns of reinforcement plies may be introduced, depending upon the nature of the article being made, but in most instances it is preferred to employ not only longitudinally introduced reinforcement elements such as the strips 48 and 63 and rovings 51 and 62, but also at least some helically wound elements such as the rovings 55.

Attention is now called to the fact that the drive system for the puller mechanism includes a motor 66 and various other drive parts indicated somewhat diagrammatically toward the bottom of FIGURE 3. This drive system may be of the kind disclosed in my issued Patent No. 3,151,354, and the details thereof need not be considered herein. However, it is to be noted that in the preferred practice of the invention, the mechanism for rotating the threading die 23 be geared to operate synchronously with the puller mechanism. For this purpose, a power takeoff from the puller drive is provided, the power takeoff unit being indicated at 67, and the output shaft 68 of that takeoff system is extended upwardly for connection with the shaft 30 which drives the gearing through which the die 23 is rotated in synchronism with operation of the puller mechanism and this provides for unscrewing of the die from the exteriorly threaded article as it is formed and delivered from the forming passage (see also FIGURE 4b).

Figure 8:
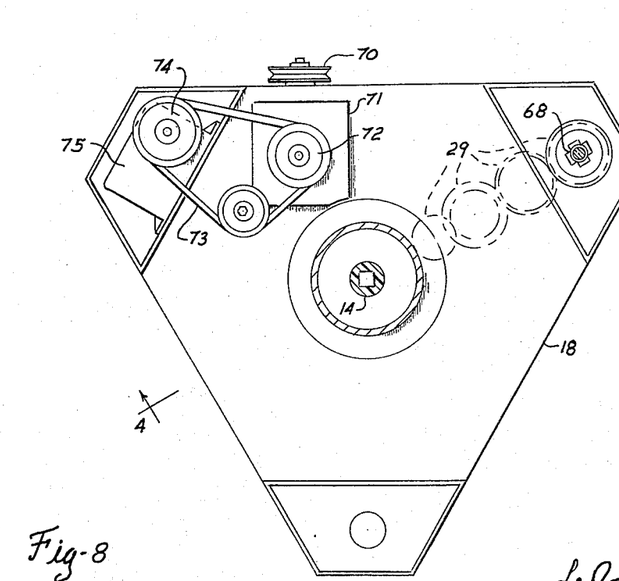
FIGURE 8 is a view taken as indicated by the line 8—8 on FIGURE 4b, on the scale of FIGURE 7.

For the purpose of driving the reinforcement winding mechanism in synchronism with the puller mechanism a power takeoff belt 69 is associated with one of the drive elements for the puller mechanism and extended upwardly therefrom to engage a pulley 70 (see FIGURES 3 and 8).

The pulley 70 operates a drive unit 71 having an output shaft carrying a pulley 72 which is coupled by means of a belt 73 with a pulley 74, operating a power transmission unit 75 with which the shaft 61 is connected. In this way the shaft 61 and thus the turntable 58 are rotated synchronously with the operation of the puller mechanism.

In connection with the foregoing arrangement it is pointed out that the employment of a core member of angular cross section, such as the squared core 24 acts to prevent rotation of the article being formed when the threaded die is rotated to unscrew the die threads from the article as it is made.

With further reference to the feed of the materials (the reinforcement and the resin into the entrance end of the forming passage) attention is directed particularly to FIGURES 3 and 4b. It will be seen that an upwardly open conically shaped resin container 76 is secured at its lower end to the upper end of the rotative die member 23. This container serves to accumulate excess resin as it flows downwardly on the reinforcement guide structure, it being preferred to feed an excess quantity of resin to the guide structure, i.e., a quantity of resin in excess of that, which when taken with the reinforcement feed, will fill the annular forming passage. By feeding an excess, it is assured that the forming passage will at all times be full, thereby preventing development of voids in the article being made. The accumulating excess resin will overflow the upper lip of the container 76 and will enter the annular reservoir or chamber 77, from which the accumulating resin is delivered through the connection 78 to the inlet side of a pump 79 also adapted to be driven by shaft 61 and having an outlet with which the resin supply pipe 43 is connected. Makeup resin may be introduced into the system through a supply pipe 80 which delivers into the annular reservoir 77. The details of this resin supply and feed system need not be considered herein, but for further information reference may be made to the copending application Serial No. 299,636, above mentioned.

Figure 9A:
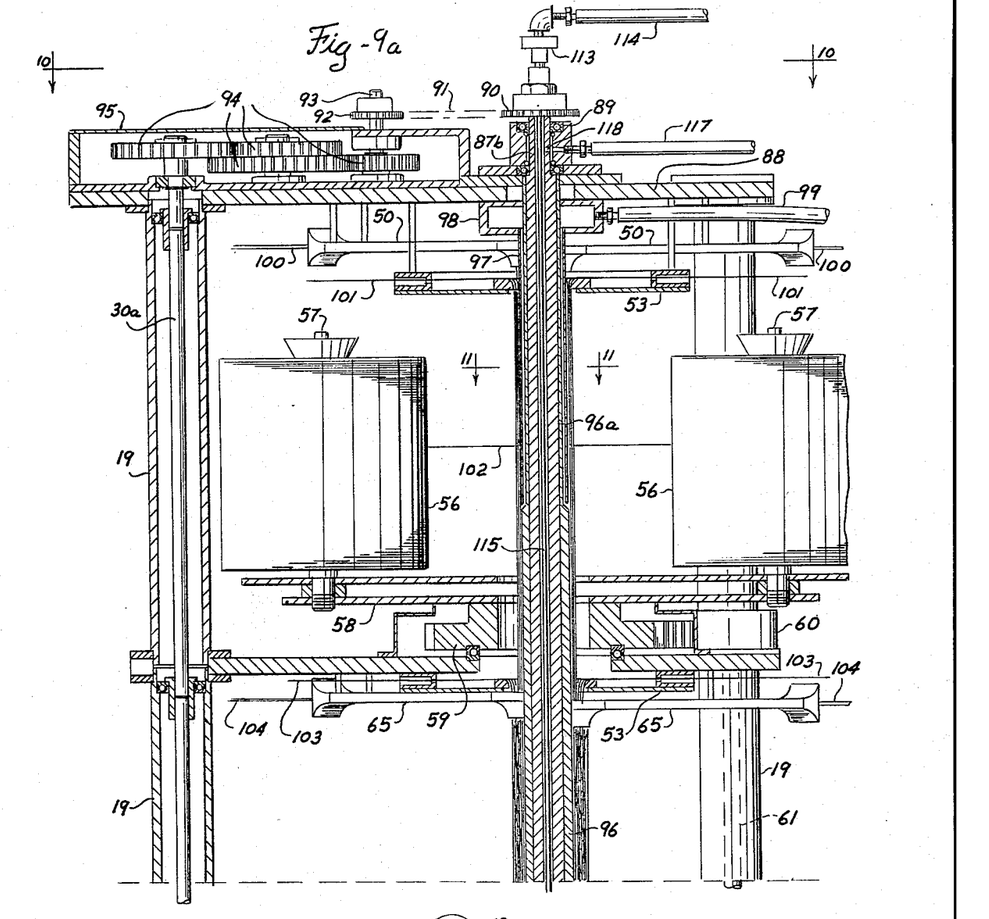
FIGURES 9a and 9b taken together illustrate in the manner of FIGURES 4a and 4b another embodiment of equipment, in this instance being arranged to produce an internally threaded article such as shown in FIGURE 2, the vertical section of these figures being taken in the plane indicated by the line 9—9 on FIGURE 10.
Figures 9B, 12:
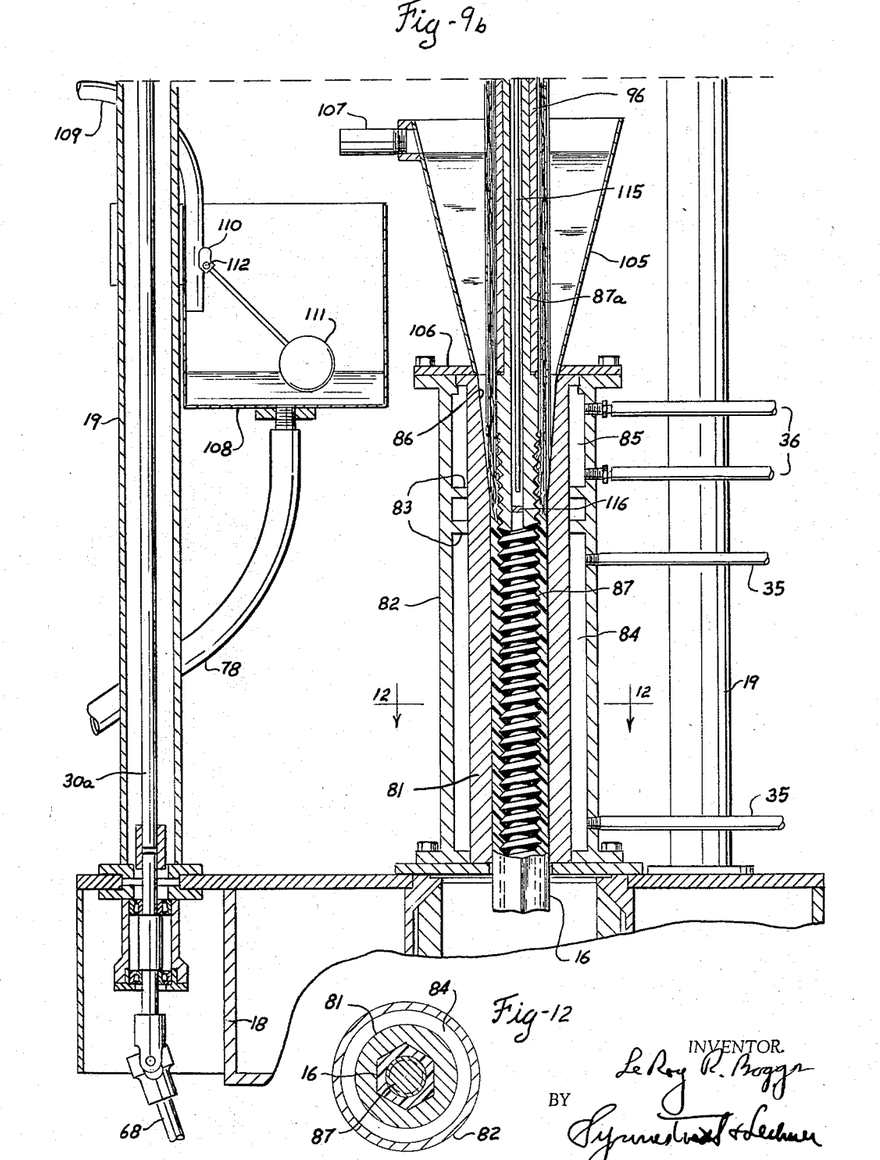
FIGURE 12 is a horizontal sectional view through certain parts taken as indicated by the line 12—12 on FIGURE 9b.

Turning now to the embodiment illustrated in FIGURES 9a and 9b, it is first to be noted that the equipment shown in these figures is adapted to the production of an internally threaded piece, for example a piece such as illustrated in FIGURE 2 having internal threads 15 and a hexagonal outside contour as employed, for example, on nuts.

Certain portions of the equipment employed for producing an internally threaded piece may be similar to or the same as those employed for making an externally threaded piece, as above described. Thus, a puller mechanism would be associated with the apparatus shown in FIGURES 9a and 9b, the puller being located below the main support 18 as before.

As in the first embodiment described, the machine is built up upon sectionalized hollow posts 19, which serve to mount the various reinforcement feed devices and also the core and reinforcement guide structure, as described below.

In considering the equipment of FIGURES 9a and 9b more specifically, attention is first called to the fact that the die member 81 here comprises a nonrotative member having a hexagonal passage or cavity therethrough conforming with the outside shape of the article to be made (see also FIGURE 12). The die is nonrotatively mounted within a surrounding sleeve or jacket 82 equipped with partition elements such as indicated at 83 which serve to divide the annular space between the jacket 82 and the die 81 into a lower heating chamber 84 and an upper cooling chamber 85. As before pipe connections 35 serve to circulate heating medium through the chamber 84 and pipe connections 36 serve to circulate a cooling medium through the chamber 85. Here again, the entrance end of the die is flared to an enlarged inlet opening as indicated at 86, for the purposes already described. The die 81 and the jacket 82 are supported upon the main support structure 18.

The core member 87 as shown in FIGURE 9b is cylindrical and externally threaded from the region of the upper end of the die down to the lower end of the core which is located at the same elevation as the lower end of the die.

Figure 10:
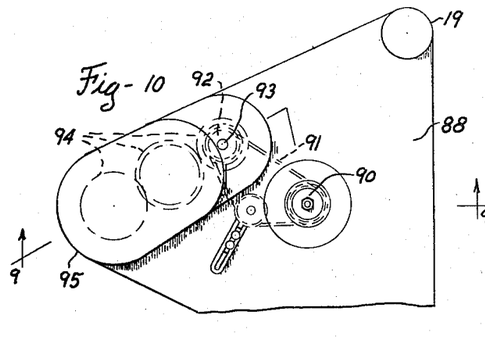
Figure 11:
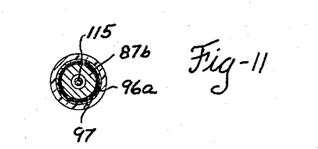

From the region of the upper end of the die, the core member is provided with an upward extension of reduced diameter indicated at 87a, and this portion extends all the way to the top of the machine, and at a point above the uppermost deck 88, the core part is further reduced in diameter as indicated at 87b. The portion 87b is journalled by bearings 89 and above the bearings the part 87b carries a driving sprocket 90 connected by a chain 91 (see also FIGURE 10) which receives power from the sprocket 92 mounted on a shaft 93. Gearing 94 arranged within a gear case 95 above the top deck 98 connects the shaft 93 with the vertical shafting 30a which extends upwardly through one of the sectionalized hollow posts 19 and which at its lower end is coupled with the shaft 68. As above described, the shaft 68 (see FIGURE 3) is extended downwardly for association with the driving system for the puller mechanism.

By the shafting, gearing, sprocket and chain arrangement just described, the core parts 87, 87a and 87b are driven and are rotated synchronously with the operation of the puller mechanism.

Surrounding the extension 87a of the core is a nonrotative sleeve 96 which extends upwardly throughout most of the height of the core extension 87a and which in the upper portion of the equipment is of reduced diameter as indicated at 96a. This tubular structure 96–96a constitutes a guide structure for reinforcements which are laid thereon in plies to be fed downwardly into the forming passage between the die member 81 and the core member 87. The part 96–96a is preferably held against rotation at its upper end and is provided with a sealing ring at its lower end adjacent the shoulder of the core part in the region of the upper end of the die, as shown in FIGURE 9b.

A sleeve 97 surrounds the portion 96a of the reinforcement guide structure and provides an annular distributing channel or passage communicating at its upper end with the chamber 98 which is supplied with liquid resin material through the supply pipe 99, this liquid resin material being delivered to the external surface of the reinforcement guide structure 96 at the region where the two parts 96 and 96a are joined. The sleeve 97 may be suspended by connection with the wall of the chamber 98, which latter may be fastened in any appropriate manner to the deck 88.

By the arrangement just described, liquid resin material is fed to the external surface of the reinforcement guide tube 96, so that the reinforcement plies laid upon the structure 96 will be impregnated with the resin material as they are drawn downwardly through the forming passage.

The arrangements for introducing the reinforcements and delivering them to the structure 96 are closely similar to those described above with reference to FIGURES 3, 4a, 4b and 7, and it is not deemed necessary to redescribe those structures with reference to the embodiment illustrated in FIGURES 9a and 9b. However, it is here noted that in a typical case, the reinforcements would include random fiber mat strips such as indicated at 100, rovings indicated at 101 fed longitudinally, rovings 102 wound helically, rovings 103 fed longitudinally, and random fiber mat strips 104 fed longitudinally.

As in the embodiment shown in FIGURE 4a, the turntable 58 is driven by means of gearing 59 connected with the drive shaft 61, which at its lower end (see FIGURES 3 and 8) is associated with the drive system for the puller mechanism to provide for synchronization of the helical winding of the rovings 102 with operation of the puller mechanism.

In the embodiment of FIGURES 9a to 12, as in the first embodiment, it is also contemplated that an excess of resin material be fed to the reinforcement guide structure 96. In this instance the excess resin accumulates in a container 105 which is mounted on the nonrotative part of the forming device, for instance by means of the bolting flange 106. The overflow 107 from the container 105 delivers the excess resin to the reservoir 108 from which the resin is withdrawn through pipe 78 leading to a resin pump of the type described above with reference to FIGURE 3 which is not shown in FIGURE 9b. The outlet from that pump would be connected with the supply line 99 (see FIGURE 9a) in order to deliver the liquid resin material to the feed chamber 98. Makeup resin may be introduced into the reservoir 108 through the supply line 109, preferably formed of a flexible hose material which is adapted to be closed off by the toggle or eccentric action of the shutoff member 110 which is connected with the float 111, the elements 110 and 111 being movable together about the mounting pivot 112. In this way an automatic valving is provided for regulating the level of liquid resin material in the reservoir 108.

As in the first embodiment, it is also contemplated to introduce a cooling liquid into the interior of the core, especially down to the region of the tapered entrance end portion in the die. For this purpose an interior cavity is provided within the extensions 87a and 87b of the core member, and at the top of the equipment, above the drive sprocket 90 (see FIGURE 9a), a rotative joint 113 is provided through which cooling liquid may be supplied from the supply pipe 114, this supply pipe connecting with the central tube 115 which extends downwardly in the central cavity in the core to a point just above the block 116. The central tube 115 is of smaller outside diameter than the inside diameter of the bore in the core member, and the intervening space is connected with the outlet pipe 117 through one or more ports such as shown at 118 formed in the portion 87b of the core member.

In the embodiment illustrated in FIGURES 9 to 12 and described above, the puller mechanism advances the materials into and through the system, the puller blocks engaging the solidified article beyond the discharge end of the forming passage. As the solidified article is drawn out of the forming passage by the puller mechanism, the threaded core is in effect unscrewed from the interior cavity being formed in the article. The employment of a die member 81 having an angular internal cavity, for instance the hexagonal cavity above referred to, provides for holding the piece being made against rotation during the unscrewing action of the core.

In accordance with the foregoing both internally and externally threaded members may be made and, if desired, the internally threaded member such as shown in FIGURE 2 may be cut off in lengths appropriate for use as nuts. Moreover, the externally threaded member such as shown in FIGURE 1 may be employed in the manner of a stud or bolt, for which purpose, if desired, a head may be secured to one end of an appropriate length cut from the continuous piece being made by means of an epoxy type adhesive.

The provision for molding articles having either internal or external threads is of great advantage in enabling production of such threaded articles without the necessity for machining the threads, which is not only disadvantageous from the standpoint of additional work involved, but also because the machining operation tends to expose random fibers, with consequent splintering off and powdering thereof.

I claim:

1. Apparatus for use in making threaded fiber reinforced resin articles comprising forming mechanism including external and internal die and core members cooperating to provide an annular forming passage through which the fiber reinforcement and hardenable liquid resin material are axially fed and in which the resin material is solidified, one of said members being of angular cross section and being nonrotative and the other of said members being threaded and being mounted for rotation about the axis of the path of feed of the reinforcement and resin material through the forming passage, puller mechanism including gripping elements for engaging and pulling on the solidified article beyond the discharge end of the forming passage, and mechanism for rotating the threaded member.

2. Apparatus according to claim 1 in which the die member is the threaded member and in which the core member is the member of angular cross section.

3. Apparatus according to claim 1 in which the core member is the threaded member and in which the die member is the member of angular cross section.

4. Apparatus according to claim 1, and further comprising fiber reinforcement feed mechanism including a device for winding a fiber reinforcement element being fed into the forming passage in a helical pattern, driving means for the winding device, and means for synchronizing operation of the winding device with the puller mechanism.

5. Apparatus according to claim 1 and further including means for synchronizing the operation of the puller mechanism and the mechanism for rotating the threaded member.

6. Apparatus according to claim 5 and further comprising fiber reinforcement feed mechanism including a device for winding a fiber reinforcement element being fed into the forming passage in a helical pattern, driving means for the winding device, and means for synchronizing operation of the winding device with the puller mechanism and with the mechanism for rotating the threaded part.

7. Apparatus for use in making threaded fiber reinforced resin articles comprising forming mechanism including external and internal die and core members cooperating to provide an annular forming passage through which the fiber reinforcement and hardenable liquid resin material are axially fed and in which the resin material is solidified, one of said members being of angular cross section and being nonrotative and the other of said members being threaded and being mounted for rotation about the axis of the path of feed of the reinforcement and resin material through the forming passage, and means for rotating the threaded member.

8. Apparatus according to claim 7 and further comprising a fiber reinforcement guide structure extended upstream of the core member, means for helically winding a fiber reinforcement element on the guide structure, puller mechanism engageable with the solidified article beyond the discharge end of the forming passage, and drive means for the puller mechanism and for the reinforcement winding means including means for synchronizing their operation.

9. Apparatus for use in making externally threaded fiber reinforced resin articles comprising a die member having an internally threaded cavity, means mounting the die member for rotation about the axis of said cavity, a core member extended in the cavity in the die member, the core member having an external surface of angular cross section and being nonrotatively mounted in the threaded cavity to provide an annular forming passage for fiber reinforcement and hardenable liquid resin material to be solidified in the forming passage, means for feeding the fiber reinforcement and liquid resin material to the entrance end of the forming passage, mechanism for pulling on the solidified article beyond the discharge end of the forming passage to advance the reinforcement and resin material into and through the forming passage, means for rotating the threaded die, and means for synchronizing the operation of the puller mechanism and the means for rotating the die.

10. Apparatus according to claim 9 adapted for use with a heat hardenable liquid resin material and further including a jacket surrounding the rotative die part to provide a chamber for a heating medium, the jacket being nonrotatively mounted, and supply and discharge pipes connected with the jacket for the circulation of a heating medium through said chamber and thereby heating the resin material to solidify it as it passes through the forming passage.

11. Apparatus according to claim 10 and further having annular rotative seals between the rotative die and the nonrotative jacket at the ends of the chamber for the heating medium.

12. Apparatus according to claim 10 in which the die is mounted for rotation about an upright axis and further including a receptacle for establishing a body of liquid resin material at the entrance end of the forming passage, the receptacle being connected and rotative with the rotative die.

13. Apparatus according to claim 12 and further including an annular nonrotative resin reservoir surrounding the receptacle and arranged to receive resin overflow from the receptacle.

14. Apparatus for use in making threaded fiber reinforced resin articles comprising a nonrotative die member having a cavity of angular cross section, a core member extended in the cavity of the die member, the core member having an externally threaded surface and being rotatively mounted in the die cavity, to provide an annular forming passage for fiber reinforcement and hardenable liquid resin material to be solidified in the forming passage, means for feeding the fiber reinforcement and liquid resin material to the entrance end of the forming passage, mechanism for pulling on the solidified article beyond the discharge end of the forming passage to advance the reinforcement and resin material into and through the forming passage, means for rotating the threaded core, and means for synchronizing the operation of the puller mechanism and the means for rotating the core.

15. Apparatus according to claim 14 and further comprising fiber reinforcement guide structure extended upstream of the rotative core and being nonrotatively mounted, the means for feeding the reinforcement including means for laying up plies of reinforcement on the guide structure.

16. Apparatus according to claim 15 in which the fiber reinforcement guide structure is hollow and further comprising a driving connection for rotating the core extended through the hollow of the reinforcement guide structure.

17. Apparatus according to claim 14 and further comprising fiber reinforcement guide structure extended upstream of the rotative core and being nonrotatively mounted, the means for feeding the fiber reinforcement including means for winding a reinforcement element on the guide structure in a helical pattern, and means for synchronizing the operation of the reinforcement winding means and the means for rotating the core.

18. Apparatus according to claim 14 and further comprising fiber reinforcement guide structure extended upstream of the rotative core and being nonrotatively mounted, the means for feeding the reinforcement including means for laying up plies of fiber reinforcement on the guide structure, and means for feeding liquid resin material to the surface of the reinforcement guide structure to provide for impregnation of reinforcement plies laid on the guide structure.

19. Apparatus according to claim 14 adapted for use with liquid heat hardenable resin material and further comprising means for heating the resin material as it passes through the forming passage, fiber reinforcement guide structure extended upstream of the rotative core, the means for feeding reinforcement and resin material to the entrance end of the forming passage including means for applying liquid resin material to the external surface of the guide structure and including means for laying plies of fiber reinforcement on the resin wetted surface of the guide extension, the guide extension being hollow, and means for cooling the entrance end portion of the die including a connection for a cooling medium extended through the hollow of the guide extension.

20. Apparatus according to claim 14 adapted for use with liquid heat hardenable resin material and further comprising means for heating the resin material as it passes through the forming passage, fiber reinforcement guide structure extended upstream of the rotative core, the means for feeding reinforcement and resin material to the entrance end of the forming passage including means for applying liquid resin material to the external surface of the guide structure and including means for laying plies of fiber reinforcement on the resin wetted surface of the guide extension, the guide extension being hollow, a drive connection for rotating the core member extended through the hollow of the guide structure, the drive connection being hollow, and means for cooling the entrance end portion of the die member including a connection for a cooling medium extended through the hollow of the drive connection.

21. Apparatus according to claim 14 adapted for use with liquid heat hardenable resin material and further comprising means for heating the resin material as it passes through the forming passage, a drive connection for the core member extended upstream from the core member, and means for cooling the core member in the region of the entrance end of the annular forming passage including a connection for a cooling medium extended upstream of the core member through the drive connection.

22. A method for making continuous lengths of a threaded fiber reinforced resin article comprising impregnating fiber reinforced resin with a liquid heat hardenable resin material, feeding the impregnated reinforcement into the entrance end of an annular forming passage one side of which is defined by a cylindrical threaded wall, heating the resin material to solidify the resin while it is in the forming passage, and thereby form a solidified article and advancing the resin and reinforcement through the forming passage and delivering the solidified article from the discharge end of the forming passage by pulling on the solidified article beyond the discharge end of the forming passage and concurrently rotating and thus unscrewing the threaded wall from the threaded article as it is formed.

References Cited by the Examiner

UNITED STATES PATENTS

| 2,801,441 | 8/1957 | Wadsworth | 18—14 |
| 2,866,230 | 12/1958 | Holte | 18—19 |
| 2,871,911 | 3/1959 | Goldworthy | 156—380 |
| 2,928,764 | 3/1960 | Magoon | 264—318 X |
| 3,119,888 | 1/1964 | Supitlov | 264—137 |
| 3,141,806 | 7/1964 | Reinman | 156—425 |
| 3,185,746 | 5/1965 | Boggs | 264—137 |

EARL M. BERGERT, *Primary Examiner.*

ROBERT F. WHITE, *Examiner.*

R. B. MOFFITT, P. DIER, *Assistant Examiners.*